May 29, 1956 L. W. RUSTAD ET AL 2,748,273
CRYSTAL HOLDER
Filed Sept. 19, 1952

INVENTORS
LEON W. RUSTAD
JOHN W. TAYLOR, JR.
BY
ATTORNEYS

United States Patent Office 2,748,273
Patented May 29, 1956

2,748,273
CRYSTAL HOLDER

Leon W. Rustad, Linthicum, and John W. Taylor, Jr., Baltimore, Md., assignors, by mesne assignments, to the United States of America as represented by the Secretary of the Navy Application September 19, 1952, Serial No. 310,392

2 Claims. (Cl. 250—31)

This invention relates to improvements in the means by which crystals in electronic equipment are inserted and removed.

The development of increasingly compact wave guide assemblies to meet with rigid weight and space requirements has necessitated a more convenient means for extracting and inserting standard crystals into their sockets. This is particularly true where balanced mixers are utilized thus making the crystals more inaccessible.

Accordingly, it is an object of the invention to provide a crystal holder which, with its crystal, comprises an easily manipulable unit for both insertion and extraction from its electronic equipment such as a radar unit.

Another object of the invention is to provide a crystal holder having a cap in which there is a crystal retaining plug, the cap and plug being so arranged that in the crystal extraction operation the cap separates from the electronic apparatus an amount limited by the plug so as to provide ample finger grip space whereby the crystal can be pulled, without rotation, directly out of the apparatus, and then the plug separated from its cap to free the crystal.

A further object of the invention is to provide a crystal holder that inserts the crystal without rotation of the crystal, such rotation being a cause of intermittent radar operation due to scratches on the crystal and/or its contact.

Other objects will become apparent in the following description of the illustrated embodiment of the invention.

Figure 1:
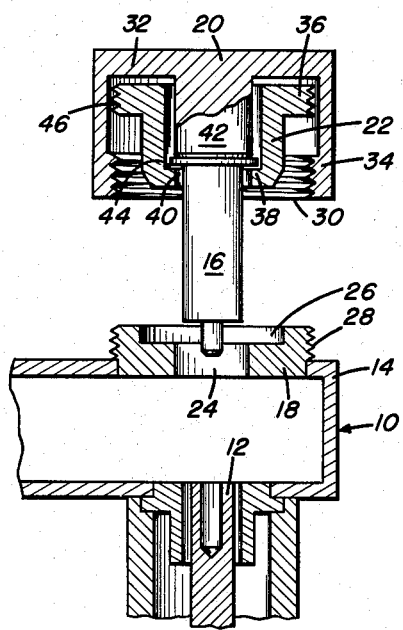
Fig. 1 is a fragmentary sectional view of a typical crystal socket in a mixer of an electronic apparatus with the crystal holder containing a crystal that is being inserted.

A fragmentary part 10 of an electronic apparatus, such as a balanced mixer in a radar set, is disclosed and is equipped with standard components including the crystal socket 12 that has a crystal point contact and carried by unshown means. The member 14 represents a part of the electronic equipment that may be used in any capacity, for example a wave guide or radar set chassis.

The crystal 16 is handled and held in place within the apparatus by three elements which make up the holder. They are a mounting base 18 that is held fixed to the member 14 within an aperture provided to accommodate the base 18, a cap 20 and a plug 22, the latter two elements being separable from the mounting base 18 as a unit and normally maintained in nested relation. Mounting base 18 has a bore 24 and a counterbore 26, both of which are axially aligned with the crystal socket 12, and external threads 28 which cooperate with internal threads 30 of cap 20 to removably connect the cap to the apparatus 10.

Cap 20 consists of an end wall 32 from which a cylindrical skirt 34 extends, and it is on the interior surface of the outer end of skirt 34 that threads 30 are formed. The plug 22 has a cylindrical body, at one end of which there extends a lateral shoulder 36, and at the other end, an inwardly directed flange 38 adjacent to a central crystal passage 40. A lug 42 fixed to the center of cap end wall 32 projects within passage 40, and the outer end of the lug constitutes means for contacting crystal 16 and applying force thereto which is directed to insert the crystal.

In operation a crystal is passed through passage 40 until the crystal flange (not numbered) rests upon the seat 44 that is formed by the upper surface of flange 38. Then the plug is ready to be fitted in the cap 20. This is done by threading the shoulder 36 which has threads 46, through threads 30 on the cap skirt 34. As the plug is moved farther into cap 20 the crystal base moves closer to lug 42, until finally they contact. Now, the cap, plug and crystal being in a compact unit, the holder is ready to be secured to apparatus 10. The point of the crystal is placed in alignment with its socket 12 and the holder moved toward mounting base 18. But, before the crystal point touches its contact, threads 28 and 30 engage thereby locating the holder for proper crystal-socket alignment.

Figure 2:
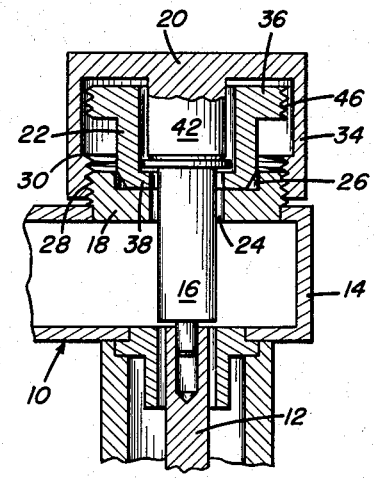
Fig. 2 is a sectional view similar to Fig. 1 with the crystal inserted and the holder fastened securely in place.

As the cap is rotated, the lower end of the lug 42 will turn freely on the crystal base, so that no rotation is imparted to the crystal, but it is moved linearly into its socket (Fig. 2). To remove the crystal, the cap 20 is threaded from the mounting base 18, during which time the lug 42 separates from the base of the crystal 16. When threads 30 separate from threads 28, the cap 20 can be moved freely axially an amount limited by the engagement of threads 30 and 46 thereby providing ample finger grip space behind the cap. Cap 20 is then pulled away from base 18 and the pulling force is transmitted to the crystal through threads 30 and 46, shoulder 36, the body of plug 22, and crystal seat 44. The crystal together with cap 20 and retainer 22 are then a single unit separated from the apparatus 10, and the crystal may be removed easily by taking the plug out of the cap.

It is understood that variations as fall within the scope of the claims may be made without departing from the protection afforded thereby.

What is claimed is:

1. A device for facilitating the insertion and removal of an elongated crystal having one end thereof flanged in and from supporting apparatus, comprising a mounting base affixed to said supporting apparatus, a cap having a depending skirt, an annular fastening element at the open end of said skirt for attaching the cap to the base, a lug depending axially from said cap within the skirit space, said lug having a blunt end forming a pressure surface for engagement with the flanged end of said crystal, a plug centrally apertured to enclose said lug within said skirt space, said plug having an annular outer shoulder at the cap end thereof and an inner flange at the other end thereof for supporting engagement with the flange of said crystal, the diameter of said plug shoulder being greater than the diameter of said cap skirt fastening device whereby said fastening device serves as a limit stop for preventing separation of said plug and cap while allowing free limited axial relative movement therebetween.

2. The crystal insertion and removal device as defined in claim 1, said fastening element and plug shoulder being similarly threaded for threaded atachment therebetween to form a single unit of said cap, plug and crystal for attachment to or removal from said base.

References Cited in the file of this patent

UNITED STATES PATENTS

| 2,226,702 | Berger | Dec. 31, 1940 |
| 2,419,613 | Webber | Apr. 29, 1947 |
| 2,438,521 | Sharpless | Mar. 30, 1948 |
| 2,484,256 | Vaughan | Oct. 11, 1949 |
| 2,647,210 | Davis | July 28, 1953 |

FOREIGN PATENTS

| 120,848 | Switzerland | Oct. 18, 1926 |